United States Patent
Kono

(10) Patent No.: US 9,826,177 B2
(45) Date of Patent: Nov. 21, 2017

(54) VIDEO SIGNAL NOISE ELIMINATION CIRCUIT AND VIDEO SIGNAL NOISE ELIMINATION METHOD

(71) Applicant: Hitachi Kokusai Electric Inc., Tokyo (JP)

(72) Inventor: Hirokazu Kono, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 34 days.

(21) Appl. No.: 14/917,671

(22) PCT Filed: Sep. 17, 2014

(86) PCT No.: PCT/JP2014/074521
§ 371 (c)(1),
(2) Date: Mar. 9, 2016

(87) PCT Pub. No.: WO2015/064234
PCT Pub. Date: May 7, 2015

(65) Prior Publication Data
US 2016/0219230 A1    Jul. 28, 2016

(30) Foreign Application Priority Data

Oct. 29, 2013  (JP) ................................. 2013-224249

(51) Int. Cl.
*H04N 5/00*        (2011.01)
*H04N 5/357*       (2011.01)
(Continued)

(52) U.S. Cl.
CPC ........... *H04N 5/3575* (2013.01); *H04N 5/142* (2013.01); *H04N 5/148* (2013.01); *H04N 5/21* (2013.01); *H04N 9/09* (2013.01); *H04N 9/64* (2013.01)

(58) Field of Classification Search
CPC ...... H04N 5/3575; H04N 5/142; H04N 5/148; H04N 5/21; H04N 9/09; H04N 9/64
(Continued)

(56) References Cited

U.S. PATENT DOCUMENTS 6,148,116 A       11/2000  Park et al.
2010/0278422 A1*  11/2010  Iketani ..................... G06T 3/403
                                                        382/165

FOREIGN PATENT DOCUMENTS

JP    2000-331152 A    11/2000
JP    2004-336651 A    11/2004
(Continued)

OTHER PUBLICATIONS

Korean Office Action dated Feb. 20, 2017, issued in corresponding Korean Patent Application No. 10-2016-7006694 and English translation thereof.
(Continued)

*Primary Examiner* — Michael Lee
*Assistant Examiner* — Omer Khalid
(74) *Attorney, Agent, or Firm* — Bacon & Thomas, PLLC

(57) ABSTRACT

There is provided a video signal noise elimination method for performing noise correction by digital processing. The video signal noise elimination method includes using, as an output video signal, a mixed video signal obtained by mixing an input video signal and a low-pass video signal at a predetermined mixing ratio corresponding to a contour signal. The method further includes subtracting an off-set, which grows larger as the low-pass video signal becomes greater, from the contour signal. The method further includes controlling the predetermined mixing ratio so that a ratio of the low-pass video signal contained in the mixed video signal increases in a portion where the contour signal is small and so that the ratio of the low-pass video signal (Continued)

contained in the mixed video signal decreases in a portion where the contour signal is large.

4 Claims, 10 Drawing Sheets

(51) Int. Cl.
  *H04N 5/21* (2006.01)
  *H04N 5/14* (2006.01)
  *H04N 9/64* (2006.01)
  *H04N 9/09* (2006.01)
(58) Field of Classification Search
  USPC ............................................. 348/624
  See application file for complete search history.

(56) References Cited

FOREIGN PATENT DOCUMENTS

| JP | 2010-200236 A | 9/2010 |
| JP | 2012-124857 A | 6/2012 |
| KR | 10-1998-0040618 A | 8/1998 |
| KR | 10-2005-0011241 A | 1/2005 |

OTHER PUBLICATIONS

International Search Report dated Dec. 2, 2014.

\* cited by examiner

FIG. 7

| d11 | d21 | d31 | d41 | d51 |
|-----|-----|-----|-----|-----|
| d12 | d22 | d32 | d42 | d52 |
| d13 | d23 | d33 | d43 | d53 |
| d14 | d24 | d34 | d44 | d54 |
| d15 | d25 | d35 | d45 | d55 |

FIG. 9

VIDEO SIGNAL NOISE ELIMINATION CIRCUIT AND VIDEO SIGNAL NOISE ELIMINATION METHOD

TECHNICAL FIELD

The present invention relates to a method for reducing noises generated in a video signal of a television camera.

BACKGROUND ART

Initially, the signal processing of a television camera will be described with reference to FIG. 1. First, a subject image passes through a lens 2 of a television camera 1. The subject image is divided into three colors of R, G and B in a prism 3 and is converted to electric signals of R, G and B in imaging elements 4R, 4G and 4B. Thereafter, the electric signals pass through correlated double sampling (CDS) circuits 5R, 5G and 5B. The electric signals are amplified in variable gain amplifier (VGA) circuits 6R, 6G and 6B and are converted to digital signals in analog-to-digital (A/D) converters 7R, 7G and 7B. The digital signals are subjected to various kinds of processing in a video signal processing unit 8 and are then outputted as television signals from a video signal output unit 9. A timing generator (TG) 10 is a unit that generates timing signals for driving the imaging elements 4 and the CDS circuits 5. A central processing unit (CPU) 11, which is a system controller, controls circuits of the respective units.

A noise elimination circuit is included in the video signal processing unit. FIG. 2 illustrates a conventional noise elimination circuit. An input video signal is inputted to a low-pass filter (LPF) 12 and a subtractor 13. A high-frequency component (random noise) of the video signal is suppressed in the LPF 12. Then, the output of the LPF 12 is inputted to the subtractor 13. In the subtractor 13, the output of the LPF 12 is subtracted from the input video signal. The output of the LPF 12 is also inputted to a level determination circuit 14 where a coefficient A is calculated. In a multiplier 15, the output of the subtractor 13 and the coefficient A of the level determination circuit 14 are multiplied. The output of the multiplier 15 and the output of the LPF 12 are added in an adder 16, thereby generating an output signal.

The aforementioned operation may be represented by a formula: output signal=input video signal·A+LPF·(1−A), where $0 \leq A \leq 1.0$. The output signal is obtained by mixing the input video signal and the LPF output at a ratio to be determined by the coefficient A. FIG. 3 shows the characteristics of the mixing coefficient A. When A=0, the output signal is equal to the LPF output, whereby a noise elimination effect is maximized. When A=1, the output signal is equal to the input video signal, whereby a noise elimination function is turned off. By appropriately setting a slope and a point, it is possible to control a brightness level, at which a noise elimination function works, and a noise elimination effect.

According to the conventional noise elimination function, as shown in FIG. 3, if the brightness level is lowered at a certain point, the noise elimination effect is gradually increased. In general, an image captured by a camera contains a portion where a brightness level is high. If one tries to obtain a noise elimination effect even in the portion where the brightness level is high, contour information is lost and the image becomes blurry. Thus, the conventional noise elimination function is applicable to only a portion where a brightness level is low and where contour information is intrinsically small.

Patent Document 1: Japanese Patent Application Publication No. 2010-200236

SUMMARY OF THE INVENTION

It is an object of the present invention to reduce noises even in a video signal having a high brightness level without making blurry a contour portion of the video signal.

In accordance of a first aspect of the present invention, there is provided a video signal noise elimination circuit, including: a low-pass filter for an input video signal; a contour extraction circuit configured to extract a contour signal from the input video signal; and a mixing circuit configured to mix video signals at a predetermined mixing ratio, wherein a mixed video signal obtained by mixing the input video signal and the low-pass video signal passing through the low-pass filter at the predetermined mixing ratio corresponding to the contour signal is used as an output video signal, the contour extraction circuit includes a unit configured to subtract an off-set, which grows larger as the low-pass video signal (a video signal level detected from the low-pass filter) becomes greater, from the extracted contour signal, the contour extraction circuit configured to subtract the off-set from the extracted contour signal, and the predetermined mixing ratio is controlled so that a ratio of the low-pass video signal contained in the mixed video signal increases in a portion where the contour signal is small (a portion where the image is flat) and so that the ratio of the low-pass video signal contained in the mixed video signal decreases in a portion where the contour signal is large (a contour portion).

The contour extraction circuit may include a circuit configured to calculate contour components from five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, and configured to select largest one of the contour components as the contour signal, and the contour extraction circuit is configured to calculate the contour components from the five 3×3 pixel regions in total including the central 3×3 pixel region of the 5×5 pixel arrangement, the 3×3 pixel region shifted by one pixel in the upward direction with respect to the central 3×3 pixel region, the 3×3 pixel region shifted by one pixel in the downward direction with respect to the central 3×3 pixel region, the 3×3 pixel region shifted by one pixel in the leftward direction with respect to the central 3×3 pixel region, and the 3×3 pixel region shifted by one pixel in the rightward direction with respect to the central 3×3 pixel region, and configured to select largest one of the contour components as the contour signal.

The contour extraction circuit may include a circuit configured to, in each of five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, calculate an absolute value of a difference between an average value of eight pixels excluding a central pixel in each of the five 3×3 pixel regions and each of the eight pixels excluding the central pixel, and configured to add all the absolute values thus calculated to generate the contour signal, and the contour extraction circuit is configured to, in each of the five 3×3 pixel regions in total including the central 3×3 pixel region of the 5×5 pixel arrangement, the 3×3 pixel region shifted by one pixel in the upward direction with respect to the central 3×3 pixel region, the 3×3 pixel region shifted by one pixel in the downward direction with respect to the central 3×3 pixel region, the 3×3 pixel region shifted by one pixel in the leftward direction with respect to the central 3×3 pixel region, and the 3×3 pixel region shifted by one pixel in the rightward direction with respect to the central 3×3 pixel region, calculate the absolute value of the difference between the average value of the eight pixels excluding the central pixel in each of the five 3×3 pixel regions and each of the eight pixels excluding the central pixel, and configured to add all the absolute values thus calculated to generate the contour signal.

In accordance with a second aspect of the present invention, there is provided a video signal noise elimination method, including: using, as an output video signal, a mixed video signal obtained by mixing an input video signal and a low-pass video signal at a predetermined mixing ratio corresponding to a contour signal; subtracting an off-set, which grows larger as the low-pass video signal becomes greater, from the contour signal; and controlling the predetermined mixing ratio so that a ratio of the low-pass video signal contained in the mixed video signal increases in a portion where the contour signal is small and so that the ratio of the low-pass video signal contained in the mixed video signal decreases in a portion where the contour signal is large.

Contour components may be calculated from five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, and largest one of the contour components is selected as the contour signal.

In each of five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, an absolute value of a difference between an average value of eight pixels excluding a central pixel in each of the five 3×3 pixel regions and each of the eight pixels excluding the central pixel may be calculated, and all the absolute values thus calculated may be added to generate the contour signal.

According to the present invention, it is possible to obtain a high noise elimination effect even in a video signal having a high brightness level without making blurry a contour portion of the video signal.

BRIEF DESCRIPTION OF THE DRAWINGS

FIG. 7 is a schematic diagram illustrating a pixel configuration of a video signal according to the embodiment of the present invention (5×5 pixels).

FIG. 9 is a schematic diagram illustrating a pixel configuration of a video signal according to the another embodiment of the present invention (3×3 pixels extracted from 5×5 pixels).

MODE FOR CARRYING OUT THE INVENTION

Figure 1:
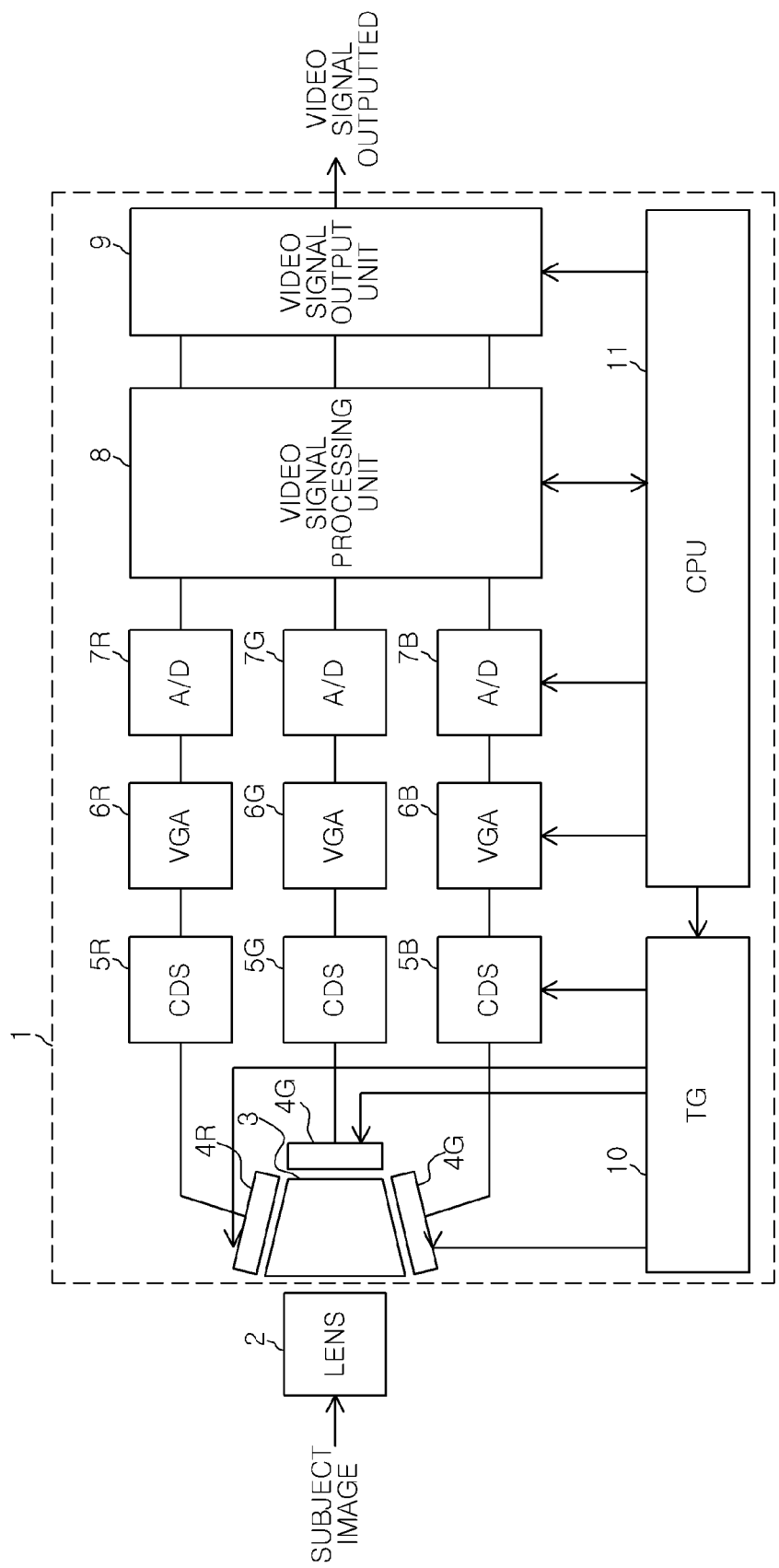
FIG. 1 is a block diagram showing a configuration of a television camera.
Figure 2:
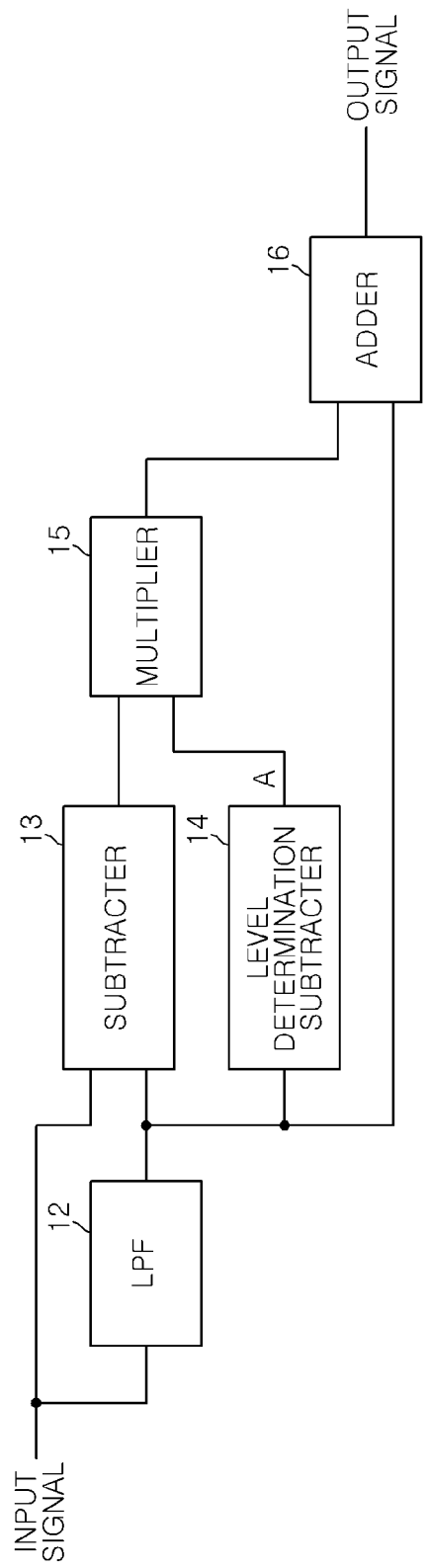
FIG. 2 is a schematic diagram illustrating an operation of a conventional noise elimination circuit.
Figure 3:
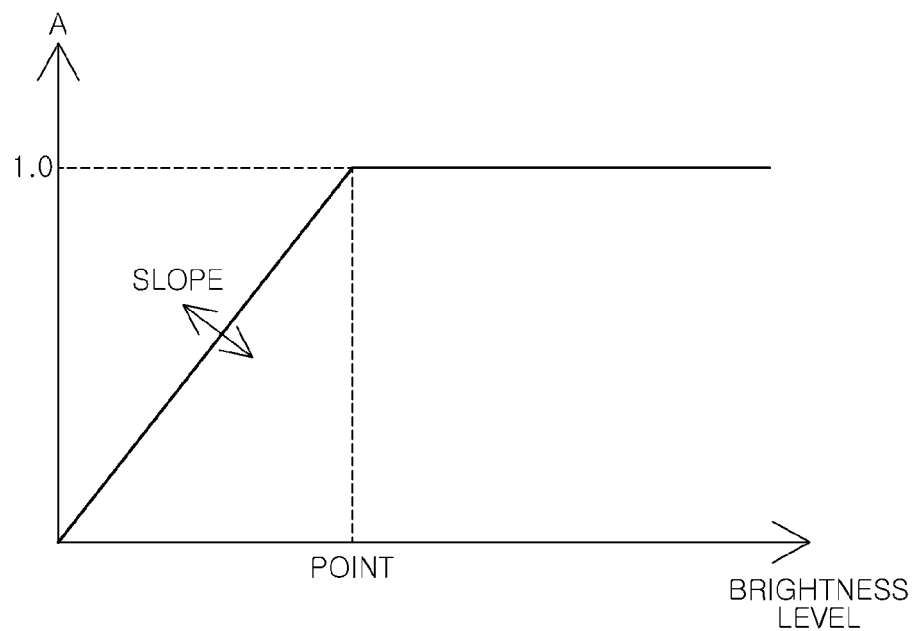
FIG. 3 is a schematic diagram showing the characteristics of a coefficient A in the conventional noise elimination circuit.

Initially, the signal processing of a television camera will be described with reference to FIG. 1. First, a subject image passes through a lens 2 of a television camera 1. The subject image is divided into three colors of R, G and B in a prism 3 and is converted to electric signals of R, G and B in imaging elements 4R, 4G and 4B. Thereafter, the electric signals pass through correlated double sampling (CDS) circuits 5R, 5G and 5B. The electric signals are amplified in variable gain amplifier (VGA) circuits 6R, 6G and 6B and are converted to digital signals in analog-to-digital (A/D) converters 7R, 7G and 7B. The digital signals are subjected to various kinds of processing in a video signal processing unit 8 and are then outputted as television signals from a video signal output unit 9. A timing generator (TG) 10 is a unit that generates timing signals for driving the imaging elements 4 and the CDS circuits 5. A central processing unit (CPU) 11, which is a system controller, controls circuits of the respective units.

First Embodiment

Figure 4:
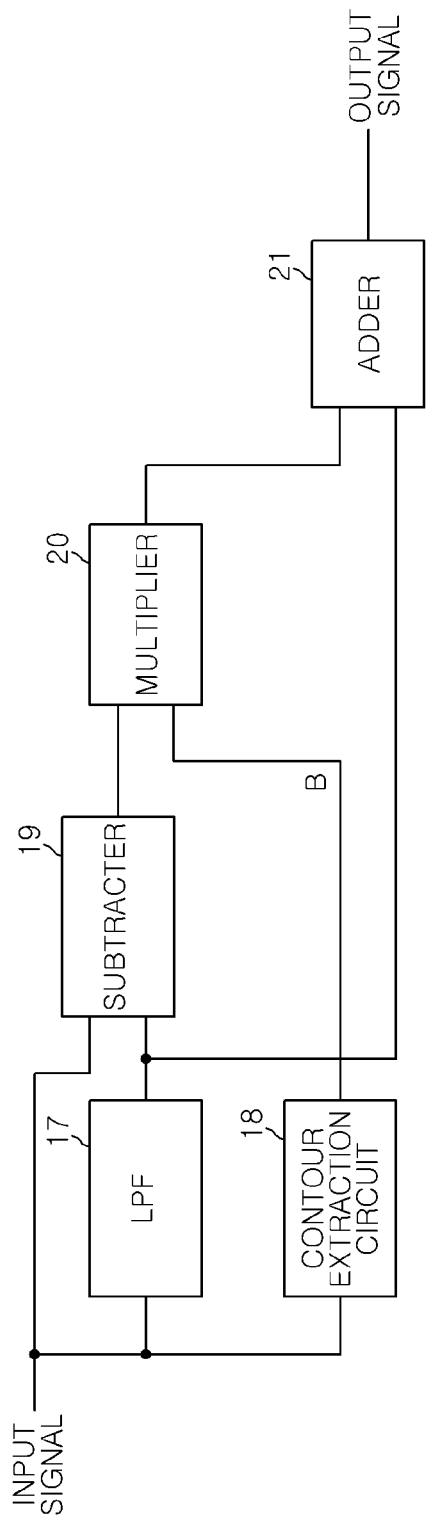
FIG. 4 is a schematic diagram illustrating an operation of a noise elimination circuit according to an embodiment of the present invention.

One embodiment of the present invention will be described with reference to FIG. 4 which illustrates an operation of a noise elimination circuit according to an embodiment of the present invention.

An input video signal is inputted to a low-pass filter (LPF) 17 and a contour extraction circuit 18. A high-frequency component (random noise) of the video signal is suppressed in the LPF 17. Then, the output of the LPF 17 is inputted to an subtractor 19. In the subtractor 19, the output of the LPF 17 is subtracted from the input video signal. In the contour extraction circuit 18, a contour component of the input video signal is extracted. The contour component becomes a mixing coefficient B which mixes the input video signal and the output of the LPF 17. In a multiplier 20, the output of the subtractor 19 and the mixing coefficient B of the contour extraction circuit 18 are multiplied. The output of the multiplier 20 and the output of the LPF 17 are added in an adder 21, thereby generating an output signal.

The aforementioned operation may be represented by a formula: output signal=input video signal·B+LPF·(1−B), where 0≤B≤1.0. The output signal is obtained by mixing the input video signal and the LPF output at a ratio to be determined by the coefficient B.

Figure 5:
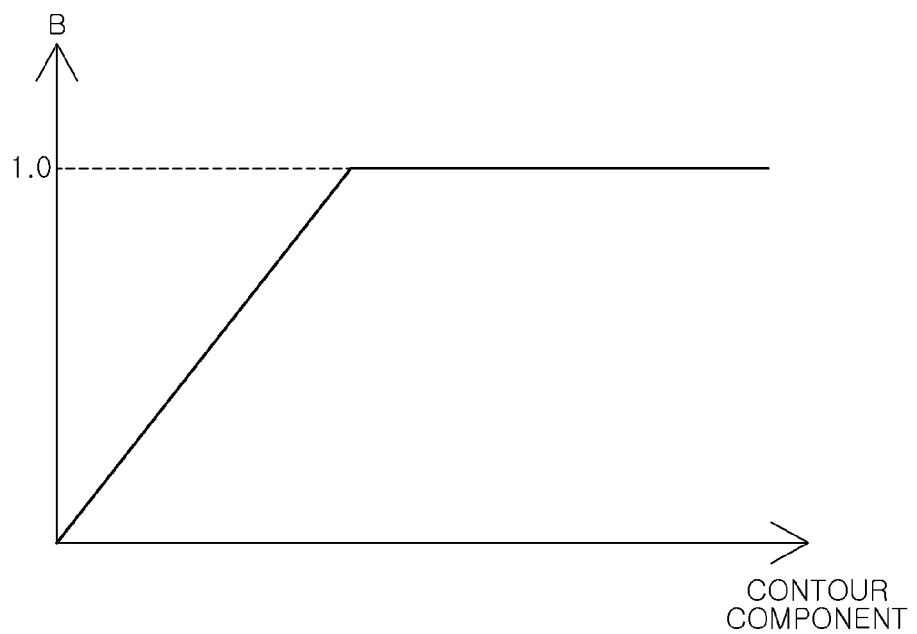
FIG. 5 is a schematic diagram showing the characteristics of a coefficient B in the noise elimination circuit according to the embodiment of the present invention.

The characteristics of the mixing coefficient B will be described with reference to FIG. 5, which is a schematic diagram showing the characteristics of the mixing coefficient B according to the present embodiment. When B=0, the output signal is equal to the LPF output, whereby a noise elimination effect is maximized. When B=1, the output signal is equal to the input video signal, whereby a noise elimination function is turned off. Due to these characteristics of the mixing coefficient B, when the contour component of the input video signal is large, the mixing coefficient B comes close to 1.0 and the LPF component becomes small. Thus, the noise elimination effect is reduced. In a flat portion having no contour, when the contour component is small, the mixing coefficient B comes close to 0 and the LPF component becomes large. Thus, the noise elimination effect is increased.

Figure 10:
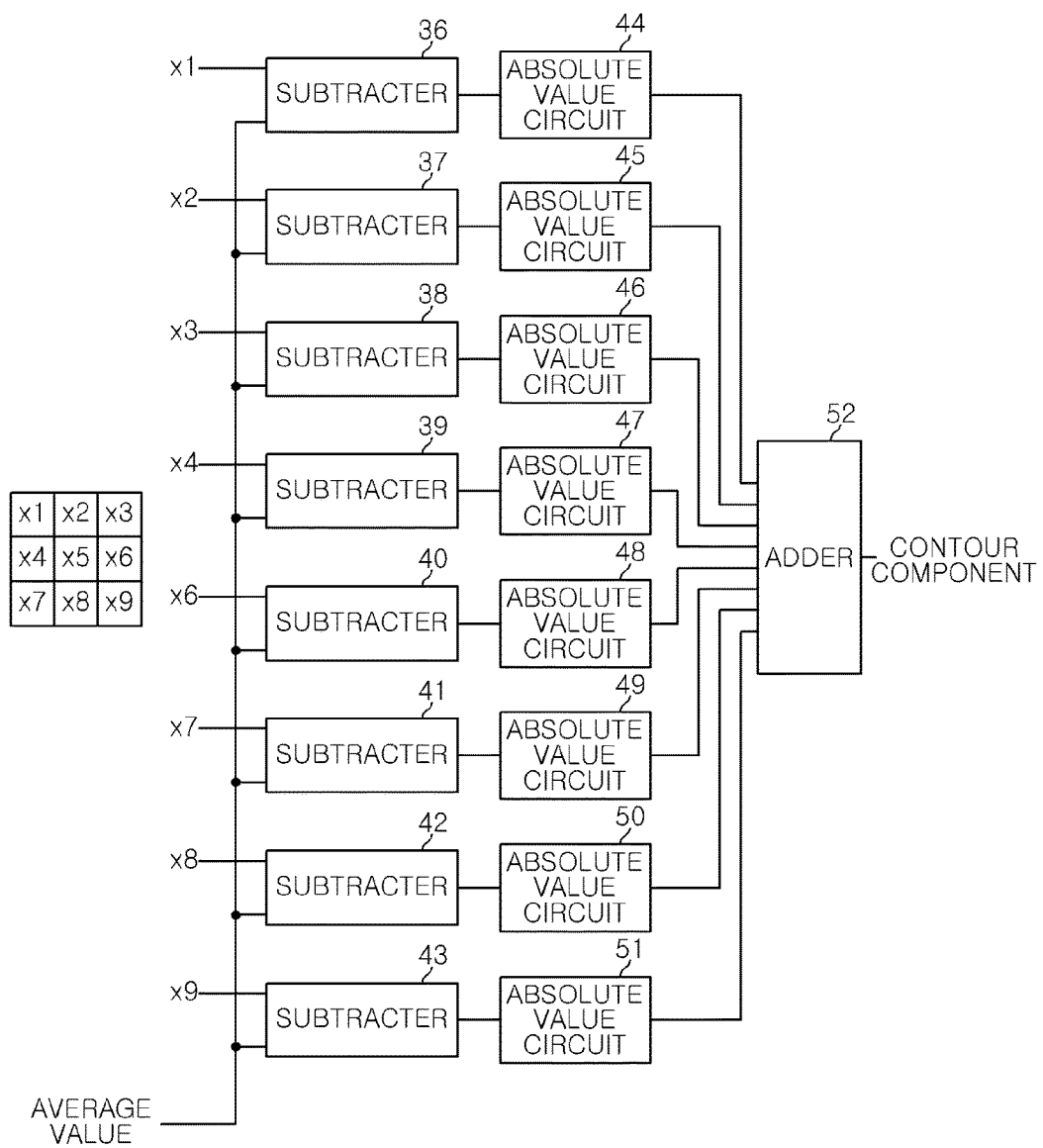
FIG. 10 is a block diagram illustrating a contour extraction circuit according to a further embodiment of the present invention.

Hereinafter, embodiments of the present invention will be described with reference to FIG. 6 which is a block diagram illustrating a contour extraction circuit according to an embodiment of the present invention, FIG. 7 which is a schematic diagram illustrating a pixel configuration of a video signal according to the embodiment of the present invention (5×5 pixels), FIG. 8 which is a block diagram illustrating a contour extraction circuit according to another embodiment of the present invention, FIG. 9 which is a schematic diagram illustrating a pixel configuration of a video signal according to the another embodiment of the present invention (3×3 pixels extracted from 5×5 pixels), and FIG. 10 which is a block diagram illustrating a contour extraction circuit according to a further embodiment of the present invention.

Figure 6:
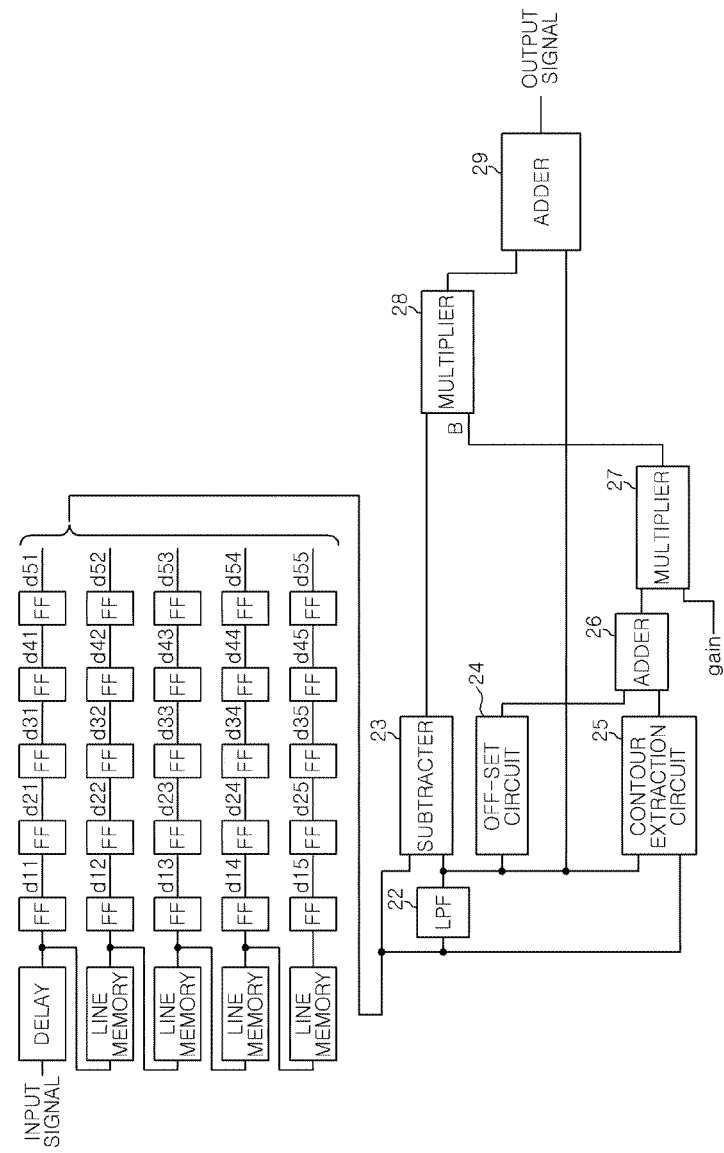
FIG. 6 is a block diagram illustrating a contour extraction circuit according to an embodiment of the present invention.

Referring to FIG. 6 which is a block diagram illustrating a contour extraction circuit according to the embodiment of the present invention, two-dimensional data of 5×5 pixels are formed from the input video signal by line memories and flip-flops.

In FIG. 7 which is a schematic diagram illustrating a pixel configuration of a video signal according to the embodiment of the present invention (5×5 pixels), the 25 pixels are designated by reference symbols d11 to d55. Hereinafter, the contour extraction circuit will be described using these reference symbols. First, data of 3×3 pixels d22, d32, d42, d23, d33, d43, d24, d34 and d44 are inputted to an LPF 22. A central pixel d33 is inputted to a subtractor 23. An average value of the 3×3 pixels is calculated in the LPF 22. While the average value is used herein, it may be possible to use a filter which changes a weighting value of each of the pixels, such as a Gaussian filter or the like. In the subtractor 23, the output of the LPF 22 is subtracted from the pixel d33. An off-set circuit 24 calculates an off-set signal for reducing noises contained in a contour signal from the output of the LPF 22 (video signal level). Light-dependent noises exist in the input video signal. Therefore, even when a contour signal is extracted, the noises are increased in the portion where the input video signal is large. The off-set signal reduces the noises. The off-set signal is found by the following equation.

Off-set signal=−LPF×gain where gain is a parameter which determines a gain with respect to the input video signal. The gain may be given as a fixed value or may be given as a variable parameter from the outside. Thus, if the input video signal grows larger, the output of the LPF 22 becomes greater. The off-set signal increases in a negative direction along with the increase of the input video signal.

The data of 5×5 pixels d11 to d55 and the average value (the output of the LPF 22) are inputted to a contour extraction circuit 25. In the present embodiment, the output signal of the LPF 22 is used as the average value. The average value is calculated from the data of 9 pixels. However, an average value calculated from the data of a larger number of pixels may be used in order to increase the accuracy.

Figure 8:
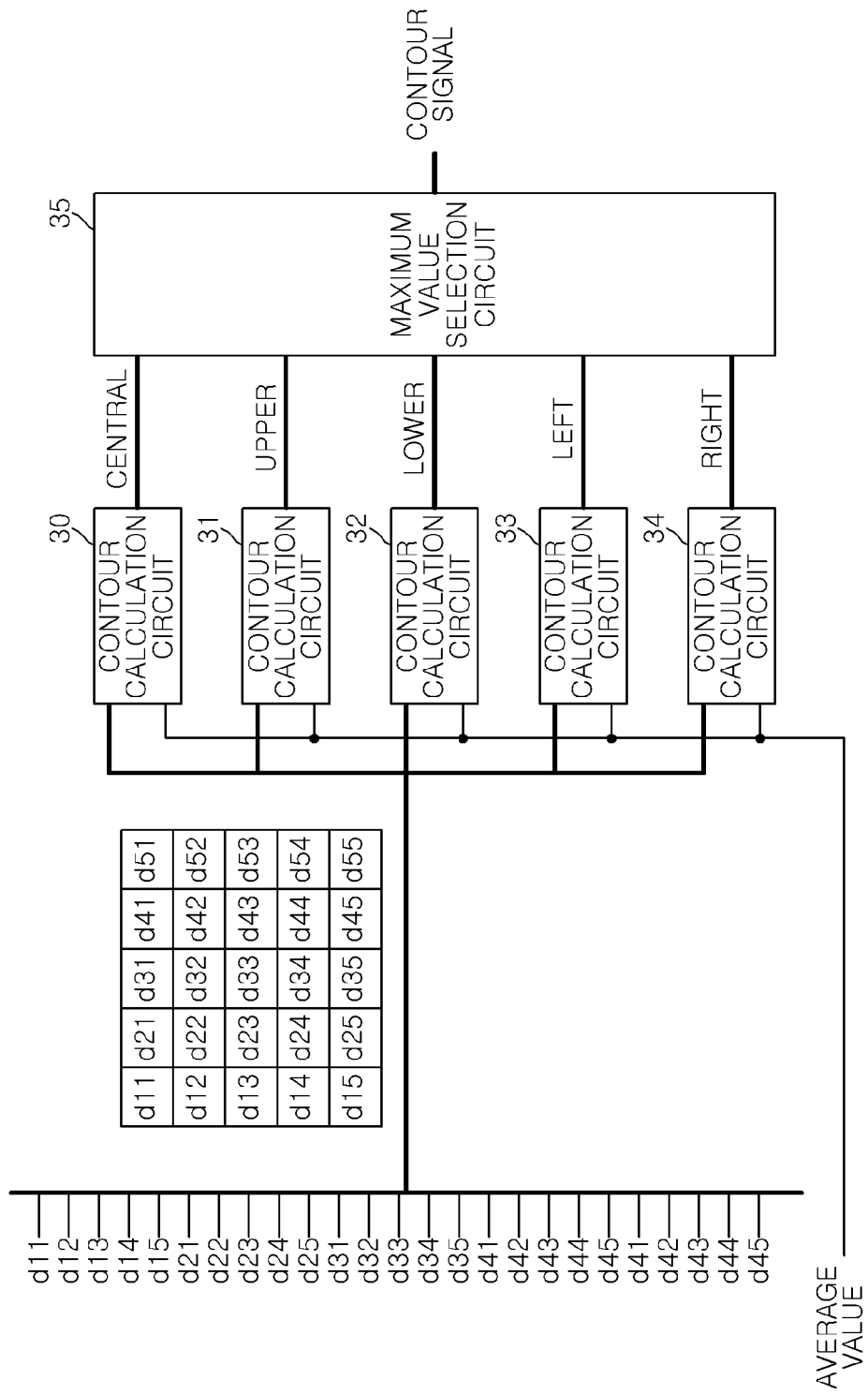
FIG. 8 is a block diagram illustrating a contour extraction circuit according to another embodiment of the present invention.

FIG. 8 illustrates a block diagram of the contour extraction circuit 25. The contour extraction circuit 25 includes contour calculation circuits 30 to 34 and a maximum value selection circuit 35. Among the 5×5 pixels inputted to the contour extraction circuit 25, one of the 3×3 pixel data of five regions, namely a central region, an upper region, a lower region, a left region and a right region (excluding the central pixel in each of the regions), and an average value of the peripheral pixels are inputted to each of the contour calculation circuits 30 to 34.

Figure 9:
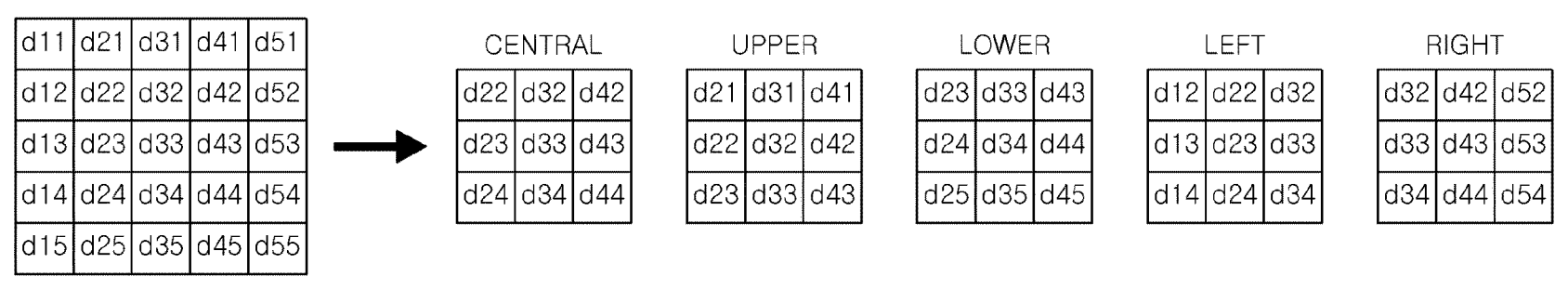

FIG. 9 illustrates the configuration of 5×5 pixels and the arrangement of 3×3 pixels of five regions, namely a central region, an upper region, a lower region, a left region and a right region. FIG. 10 illustrates a block diagram of the contour calculation circuit. The contour calculation circuit includes subtractors 36 to 43, absolute value circuits 44 to 51 and an adder 52. Data of 8 pixels excluding the central pixel, among the 3×3 pixel data, are inputted to the contour calculation circuit. A difference between x1 and the average value is calculated in the subtractor 36 and an absolute value is calculated in the absolute value circuit 44. A difference between x2 and the average value is calculated in the subtractor 37 and an absolute value is calculated in the absolute value circuit 45. A difference between x3 and the average value is calculated in the subtractor 38 and an absolute value is calculated in the absolute value circuit 46. A difference between x4 and the average value is calculated in the subtractor 39 and an absolute value is calculated in the absolute value circuit 47. A difference between x6 and the average value is calculated in the subtractor 40 and an absolute value is calculated in the absolute value circuit 48. A difference between x7 and the average value is calculated in the subtractor 41 and an absolute value is calculated in the absolute value circuit 49. A difference between x8 and the average value is calculated in the subtractor 42 and an absolute value is calculated in the absolute value circuit 50. A difference between x9 and the average value is calculated in the subtractor 43 and an absolute value is calculated in the absolute value circuit 51. All the absolute values thus calculated are added in the adder 52. The added value is outputted as a contour component.

Referring back to FIG. 8, descriptions will be further made. A contour component of the central region is outputted from the contour calculation circuit 30. A contour component of the upper region is outputted from the contour calculation circuit 31. A contour component of the lower region is outputted from the contour calculation circuit 32. A contour component of the left region is outputted from the contour calculation circuit 33. A contour component of the right region is outputted from the contour calculation circuit 34. Thus, the contour components of five regions in total are outputted. The largest contour component among the five contour components is selected by the maximum value selection circuit 35 and is outputted as a contour signal.

Referring back to FIG. 6, descriptions will be further made. In an adder 26, the output of the contour extraction circuit 25 and the output of the off-set circuit 24 are added. In a multiplier 27, the output of the adder 26 is multiplied by a predetermined gain to obtain a mixing coefficient B. The gain may be given as a fixed value or may be given as a variable parameter from the outside. In a multiplier 28, the output of the subtractor 23 and the mixing coefficient B are multiplied. The output of the multiplier 28 and the output of the LPF 22 are added in the adder 29 to generate an output signal.

As described above, the input video signal is outputted as it is in the contour portion. The signal, from which noises are eliminated, is outputted in the flat portion having no contour.

INDUSTRIAL APPLICABILITY

Even when using a CMOS imaging element whose noise level increases in correlation with a brightness level, it is possible to reduce noises without making blurry a contour portion of a video signal. Thus, even if the CMOS imaging element is used, it is possible to realize a television camera for broadcasting.

DESCRIPTION OF REFERENCE SYMBOLS

1: television camera, 2: lens, 3: prism, 4R, 4G, 4B: imaging element, 5R, 5G, 5B: CDS circuit, 6R, 6G, 6B: VGA circuit, 7R, 7G, 7B: A/D converter, 8: video signal processing unit, 9: video signal output unit, 10: TG, 11: CPU, 12: LPF, 13: subtractor, 14: level determination circuit, 15: multiplier, 16: adder

What is claimed is:
1. A video signal noise elimination circuit, comprising:
a low-pass filter for an input video signal;
a contour extraction circuit configured to extract a contour signal from the input video signal; and
a mixing circuit configured to mix video signals at a predetermined mixing ratio,
wherein a mixed video signal obtained by mixing the input video signal and the low-pass video signal passing through the low-pass filter at the predetermined mixing ratio corresponding to the contour signal is used as an output video signal,
the contour extraction circuit includes a unit configured to subtract an off-set, which grows larger as the low-pass video signal becomes greater, from the extracted contour signal, the contour extraction circuit configured to subtract the off-set from the extracted contour signal,
the predetermined mixing ratio is controlled so that a ratio of the low-pass video signal contained in the mixed video signal increases in a portion where the contour signal is small and so that the ratio of the low-pass video signal contained in the mixed video signal decreases in a portion where the contour signal is large,
the contour extraction circuit includes a circuit configured to calculate contour components from five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, and configured to select largest one of the contour components as the contour signal, and the contour extraction circuit is configured to calculate the contour components from the five 3×3 pixel regions in total including the central 3×3 pixel region of the 5×5 pixel arrangement, the 3×3 pixel region shifted by one pixel in the upward direction with respect to the central 3×3 pixel region, the 3×3 pixel region shifted by one pixel in the downward direction with respect to the central 3×3 pixel region, the 3×3 pixel region shifted by one pixel in the leftward direction with respect to the central 3×3 pixel region, and the 3×3 pixel region shifted by one pixel in the rightward direction with respect to the central 3×3 pixel region, and configured to select largest one of the contour components as the contour signal.

2. A video signal noise elimination circuit, comprising:
a low-pass filter for an input video signal;
a contour extraction circuit configured to extract a contour signal from the input video signal; and
a mixing circuit configured to mix video signals at a predetermined mixing ratio,
wherein a mixed video signal obtained by mixing the input video signal and the low-pass video signal passing through the low-pass filter at the predetermined mixing ratio corresponding to the contour signal is used as an output video signal,
the contour extraction circuit includes a unit configured to subtract an off-set, which grows larger as the low-pass video signal becomes greater, from the extracted contour signal, the contour extraction circuit configured to subtract the off-set from the extracted contour signal,
the predetermined mixing ratio is controlled so that a ratio of the low-pass video signal contained in the mixed video signal increases in a portion where the contour signal is small and so that the ratio of the low-pass video signal contained in the mixed video signal decreases in a portion where the contour signal is large,
the contour extraction circuit includes a circuit configured to, in each of five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, calculate an absolute value of a difference between an average value of eight pixels excluding a central pixel in each of the five 3×3 pixel regions and each of the eight pixels excluding the central pixel, and configured to add all the absolute values thus calculated to generate the contour signal, and the contour extraction circuit is configured to, in each of the five 3×3 pixel regions in total including the central 3×3 pixel region of the 5×5 pixel arrangement, the 3×3 pixel region shifted by one pixel in the upward direction with respect to the central 3×3 pixel region, the 3×3 pixel region shifted by one pixel in the downward direction with respect to the central 3×3 pixel region, the 3×3 pixel region shifted by one pixel in the leftward direction with respect to the central 3×3 pixel region, and the 3×3 pixel region shifted by one pixel in the rightward direction with respect to the central 3×3 pixel region, calculate the absolute value of the difference between the average value of the eight pixels excluding the central pixel in each of the five 3×3 pixel regions and each of the eight pixels excluding the central pixel, and configured to add all the absolute values thus calculated to generate the contour signal.

3. A video signal noise elimination method, comprising:
using, as an output video signal, a mixed video signal obtained by mixing an input video signal and a low-pass video signal at a predetermined mixing ratio corresponding to a contour signal;
subtracting an off-set, which grows larger as the low-pass video signal becomes greater, from the contour signal; and
controlling the predetermined mixing ratio so that a ratio of the low-pass video signal contained in the mixed video signal increases in a portion where the contour signal is small and so that the ratio of the low-pass video signal contained in the mixed video signal decreases in a portion where the contour signal is large, wherein contour components are calculated from five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, and largest one of the contour components is selected as the contour signal.

4. A video signal noise elimination method, comprising:
using, as an output video signal, a mixed video signal obtained by mixing an input video signal and a low-pass video signal at a predetermined mixing ratio corresponding to a contour signal;
subtracting an off-set, which grows larger as the low-pass video signal becomes greater, from the contour signal; and
controlling the predetermined mixing ratio so that a ratio of the low-pass video signal contained in the mixed video signal increases in a portion where the contour signal is small and so that the ratio of the low-pass video signal contained in the mixed video signal decreases in a portion where the contour signal is large, wherein in each of five 3×3 pixel regions in total including a central 3×3 pixel region of a 5×5 pixel arrangement, a 3×3 pixel region shifted by one pixel in an upward direction with respect to the central 3×3 pixel region, a 3×3 pixel region shifted by one pixel in a downward direction with respect to the central 3×3 pixel region, a 3×3 pixel region shifted by one pixel in a leftward direction with respect to the central 3×3 pixel region, and a 3×3 pixel region shifted by one pixel in a rightward direction with respect to the central 3×3 pixel region, an absolute value of a difference between an average value of eight pixels excluding a central pixel in each of the five 3×3 pixel regions and each of the eight pixels excluding the central pixel is calculated, and all the absolute values thus calculated are added to generate the contour signal.

* * * * *